(12) United States Patent
Yoneda

(10) Patent No.: US 7,613,558 B2
(45) Date of Patent: Nov. 3, 2009

(54) DIFFERENTIAL LIMITING CONTROL APPARATUS FOR A VEHICLE AND THE METHOD THEREOF

(75) Inventor: Takeshi Yoneda, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/667,396

(22) Filed: Sep. 23, 2003

(65) Prior Publication Data

US 2004/0059494 A1 Mar. 25, 2004

(30) Foreign Application Priority Data

Sep. 24, 2002 (JP) ............... P. 2002-278131

(51) Int. Cl.
*G06F 17/00* (2006.01)
*F16H 59/18* (2006.01)

(52) U.S. Cl. ............... 701/67; 701/69; 701/60; 700/28; 123/90.15; 340/453; 702/183; 74/336 R

(58) Field of Classification Search ............ 701/69, 701/65, 67, 60, 61, 51, 58; 180/248, 249, 180/197; 477/35, 167; 74/336 R; 700/28; 123/90.15; 340/453; 702/183
See application file for complete search history.

(56) References Cited

U.S. PATENT DOCUMENTS

| 4,713,596 | A | | 12/1987 | Bose |
| 4,989,686 | A | * | 2/1991 | Miller et al. ............ 180/197 |
| 5,079,708 | A | | 1/1992 | Brown ............ 364/424.05 |
| 5,461,568 | A | | 10/1995 | Morita ............ 364/426.03 |
| 5,809,443 | A | | 9/1998 | Perttunen et al. ............ 701/69 |
| 5,927,425 | A | | 7/1999 | Kusano ............ 180/248 |
| 5,947,224 | A | | 9/1999 | Kouno |

(Continued)

FOREIGN PATENT DOCUMENTS

EP 160 486 A2 5/2001

(Continued)

OTHER PUBLICATIONS

Search Report and Annex to Search Report issued in EU Pat. App. No. 0 3 25 5996.5-2422 dated May 7, 2006.

(Continued)

*Primary Examiner*—Khoi Tran
*Assistant Examiner*—Ronnie Mancho
(74) *Attorney, Agent, or Firm*—Smith, Gambrell & Russell, LLP

(57) ABSTRACT

The differential limiting control apparatus having a clutch unit interposed between one rotational shaft and the other rotational shaft for variably transmitting a driving force between the one rotational shaft and the other rotational shaft, having: a feedback control unit for computing the clutch torque on basis of vehicle behaviors through a feedback control, a feed forward control unit for computing the clutch torque based on the behaviors through feed forward control, a tire diameter difference computing unit for computing a diameter difference of a tire, and a clutch torque computing unit for computing a final clutch torque by changing a ratio of the clutch torque obtained through the feedback control and a clutch torque obtained through the feed forward control so as to appropriately decide the feed forward control by effectively suppressing the tire slip while avoiding the occurrence of the internal circulation of the torque.

17 Claims, 4 Drawing Sheets

U.S. PATENT DOCUMENTS

| | | | |
|---|---|---|---|
| 5,979,584 A * | 11/1999 | Glab et al. | 180/249 |
| 5,993,338 A | 11/1999 | Kato et al. | |
| 6,009,968 A | 1/2000 | Kouno | |
| 6,040,768 A * | 3/2000 | Drexl | 340/453 |
| 6,047,231 A * | 4/2000 | Rodrigues et al. | 701/69 |
| 6,431,131 B1 | 8/2002 | Hosoya et al. | |
| 6,497,301 B2 | 12/2002 | Iida et al. | |
| 6,498,974 B1 * | 12/2002 | Rodrigues et al. | 701/69 |
| 6,502,027 B2 * | 12/2002 | Saotome et al. | 701/67 |
| 6,553,303 B2 * | 4/2003 | Matsuno | 701/67 |
| 6,575,870 B2 * | 6/2003 | Kitano et al. | 477/3 |
| 6,631,779 B2 * | 10/2003 | Watson et al. | 180/248 |
| 6,725,175 B1 | 4/2004 | Hosoya et al. | |
| 2002/0005077 A1 * | 1/2002 | Ozaki et al. | 74/336 R |
| 2002/0014958 A1 * | 2/2002 | Inoue et al. | 340/453 |
| 2002/0033291 A1 | 3/2002 | Ida et al. | |

FOREIGN PATENT DOCUMENTS

| | | |
|---|---|---|
| EP | 160 486 A3 | 5/2001 |
| EP | 188 597 A2 | 9/2001 |
| EP | 188 597 A3 | 9/2001 |
| JP | 3-37424 | 2/1991 |
| JP | 6-211063 | 8/1994 |
| JP | 9-109716 | 4/1997 |
| JP | 9-123778 | 5/1997 |
| JP | 2000-16268 | 1/2000 |
| JP | 2002-87093 | 3/2002 |
| JP | 2002161797 | 6/2002 |

OTHER PUBLICATIONS

Notice of Reason of Rejection issued in corresponding Japanese Patent Application 2002-278131 on May 7, 2008.

* cited by examiner

DIFFERENTIAL LIMITING CONTROL APPARATUS FOR A VEHICLE AND THE METHOD THEREOF

BACKGROUND OF THE INVENTION

1. Field of the Invention

The present invention relates to a differential limiting control apparatus for a vehicle installed between a front axle and a rear axle of a four wheel drive vehicle, particularly to a differential limiting a differential motion between rotational shafts of front and rear wheel.

2. Description of the Related Art

Conventionally, as a differential limiting control between one rotational shaft and the other rotational shaft, in particular, between front and rear axles of a four wheel drive vehicle, a technique has been known in which an actual differential speed between the rotational shafts is detected is caused to converge to a target differential speed by a feedback control through a PID (proportional Integration and Differentiation) control.

In addition, JP-A-9-109716 discloses a four wheel drive control apparatus for controlling such a clutch that a feedback control is implemented in which a torque distributed to front wheels is increased in accordance with a front and rear wheel speed differential between the rear wheel speed which are main driving wheels and the front wheel speed which are sub-driving wheels when a vehicle is normally driven, and a feed forward control is implemented in which a torque distributed to the front wheels is set in accordance with a throttle opening when the vehicle is started from rest.

In the aforementioned related art, however, the influence is not taken into consideration that is caused by the occurrence of a rotational speed differential triggered when there is a difference in a tire air pressure or tires which are different in diameter are mounted, and there is a probability that a slip control does not function properly due to the difference in the tire air pressure due to a diameter difference even when the feedback control is combined with the feed forward control, whereby the compatibility of stable vehicle behaviors and improved limit performance is made difficult to be attained. In addition, in case a tire which differs largely in the diameter from the others is mounted, an internal (or in-between)circulating torque increases, and depending upon conditions, there may be caused a risk that a reverse torque is generated on one or some of the tires.

SUMMARY OF THE INVENTION

The present invention was made in view of the situations, and an object thereof is to provide a differential limiting control apparatus for a vehicle which can set an appropriate ratio of a clutch torque value obtained through a feed forward control and the clutch torque value obtained through a feedback control in consideration of the diameter difference of tires mounted as well and which can effectively suppress a slippage as well while avoiding the generation of the internal circulating torque.

With a view to attaining the object, according to a first aspect of the present invention, there is provided a differential limiting control apparatus for the vehicle comprising a clutch unit interposed between a rotational shaft and another rotational shaft for variably transmitting a driving force between the rotational shaft and the other rotational shaft, the differential limiting control apparatus for the vehicle comprising further a torque computing unit for computing a clutch torque of the clutch unit based on behaviors of the vehicle through a feedback control, a feed forward control unit for computing the clutch torque based on the behavior of the vehicle through the feed forward control, a tire diameter difference computing unit for computing a diameter difference of the tire mounted, and a clutch torque computing unit for computing a final clutch torque by changing a ratio of the clutch torque obtained through the feedback control and the clutch torque obtained through the feed forward control according to the diameter difference of the tire.

According to a second aspect of the present invention, there is provided the differential limiting control apparatus for the vehicle as set forth in the first aspect of the present invention, wherein the feedback control clutch torque computing unit has a target differential speed setting unit for setting a target differential speed between the one rotational shaft and the other rotational shaft, an actual differential speed detecting unit for detecting an actual differential speed between the one rotational shaft and the other rotational shaft, and a clutch torque computing and outputting unit for computing an engagement force of the clutch unit by obtaining a deviation between the target differential speed and the actual differential speed, configuring a switching function by using at least a polarity related to an integral term of the deviation, and applying a sliding mode control.

According to a third aspect of the present invention, there is provided differential limiting control apparatus for the vehicle as set forth in the first aspect of the present invention, wherein the clutch torque computing unit reduces the ratio of clutch torque obtained through the feed forward control as the diameter difference of the tire increases.

According to a fourth aspect of the present invention, there is provided a differential limiting control apparatus for a vehicle as set forth in the first aspect of the present invention, wherein the tire diameter difference computing unit calculates a diameter difference based on at least an actual differential speed between the one rotational shaft and the other rotational sift when the vehicle is running substantially straight and a slippage is difficult to be generated on the wheels.

According to a fifth aspect of the present invention, there is provided the differential limiting control apparatus for the vehicle as set forth in any of the first to fourth aspects of the present invention, wherein the clutch unit is interposed between a front axle and a rear axle.

According to a sixth aspect of the present invention, there is provided the differential limiting control apparatus for the vehicle as set forth in any of the first to fourth aspect of the present invention, wherein the clutch unit limits the differential action between left and right wheels.

With a view to attaining the object, according to a seventh aspect of the present invention, there is provided the differential limiting control method for the vehicle having a clutch unit interposed between one rotational shaft and the other rotational shaft for variably transmitting a driving force between the one rotational shaft and the other rotational shaft, comprising the steps of computing a clutch torque of the clutch unit based on behaviors of the vehicle through a feedback control, calculating a clutch torque based on the behaviors of the vehicle through the feed forward control, estimating a diameter difference of the tire, and deriving a final clutch torque by changing a ratio of a clutch torque obtained through the feedback control and the feed forward control according to the diameter difference of the tire.

According to an eighth aspect of the present invention, there is provided the differential limiting control method for the vehicle as set forth in the seventh aspect of the present invention, wherein the feedback control clutch torque computing step has a target differential speed setting step for setting a target differential speed between the one rotational shaft and the other rotational shaft, an actual differential speed detecting step for detecting an actual differential speed between the one rotational shaft and the other rotational shaft, and a clutch torque computing and outputting step for computing an engagement force of the clutch unit by obtaining a deviation between the target differential speed and the actual differential speed, configuring a switching function by using at least a polarity related to an integral term of the deviation, and applying a sliding mode control.

According to a ninth aspect of the present invention, there is provided the differential limiting control method for the vehicle as set forth in the seventh aspect of the present invention, wherein the clutch torque computing step reduces the ratio of clutch torque obtained through the feed forward control as the diameter difference of the tire increases.

According to a tenth aspect of the present invention, there is provided the differential limiting control method for the vehicle as set forth in the seventh aspect of the present invention, wherein the tire diameter difference computing step calculates a diameter difference based on at least an actual differential speed between the one rotational shaft and the other rotational shaft when the vehicle is running substantially straight and a slippage is difficult to be generated on the wheels.

According to a eleventh aspect of the present invention, there is provided the differential limiting control method for the vehicle as set forth in any of the seventh to tenth aspects of the present invention, wherein the clutch unit is interposed between a front axle and a rear axle.

According to a twelfth aspect of the present invention, there is provided the differential limiting control method for the vehicle as set forth in any of the seventh to tenth aspect of the present invention, wherein the clutch unit limits the differential action of a differential interposed between left and right wheels.

Namely, in the differential limiting control apparatus for the vehicle according to the present invention, the feedback control clutch torque computing unit computes the clutch torque of the clutch unit interposed between the one rotational shaft and the other rotational shaft for variably transmitting the driving force between the one rotational shaft and the other rotational shaft based on the behavior of the vehicle through the feedback control, and the feed forward control clutch torque computing unit computes the clutch torque of the clutch unit based on the behavior of the vehicle through the feed forward control. In addition, the tire diameter difference computing unit computes a diameter difference of the tire mounted. Then, the clutch torque computing unit computes the final clutch torque by varying the ratio of the clutch torque obtained according to the diameter difference of the tire through the feedback control and the clutch torque obtained through the feed forward control. Due to this, the diameter difference of the tire is taken into consideration, and the ratio of the clutch torque value obtained through the feedback control and the clutch torque value obtained through the feed forward control is set appropriately, whereby the slippage can also be suppressed effectively while avoiding the generation of the internal circulating torque.

At this time, as is described in the second aspect of the present invention, to be specific, the feedback control clutch torque computing unit uses the target differential speed setting unit to set the target differential speed between the one rotational shaft and the other rotational shaft, the actual differential speed detecting unit to detect the actual differential speed between the one rotational shaft and the other rotational shaft, and the clutch torque computing and outputting unit to compute an engagement force of the clutch unit by obtaining the deviation between the target differential speed and the actual differential speed, configuring a switching function by using at least the polarity related to the integral term of the deviation, and applying a sliding mode control.

Then, as is described in the third aspect of the present invention, the clutch torque computing unit reduces the ratio of the clutch torque obtained through the feed forward control as the diameter difference of the tire increases.

In addition, as is described in the fourth aspect of the present invention, the clutch torque computing unit computes a diameter difference based on at least an actual differential speed between the one rotational shaft and the other rotational shaft when the vehicle is running substantially straight and the slippage is difficult to be generated on the road.

The clutch unit aiming at implementing the control is the clutch unit interposed between the front axle and the rear axle as is described in the fifth aspect of the present invention or the clutch unit for limiting the differential motion of the differential interposed between the left and right wheel as is described in the sixth aspect of the present invention.

DETAILED DESCRIPTION OF THE PREFERRED EMBODIMENTS

An embodiment of the present invention will be described below by referring to the accompanying drawings.

Figure 1:
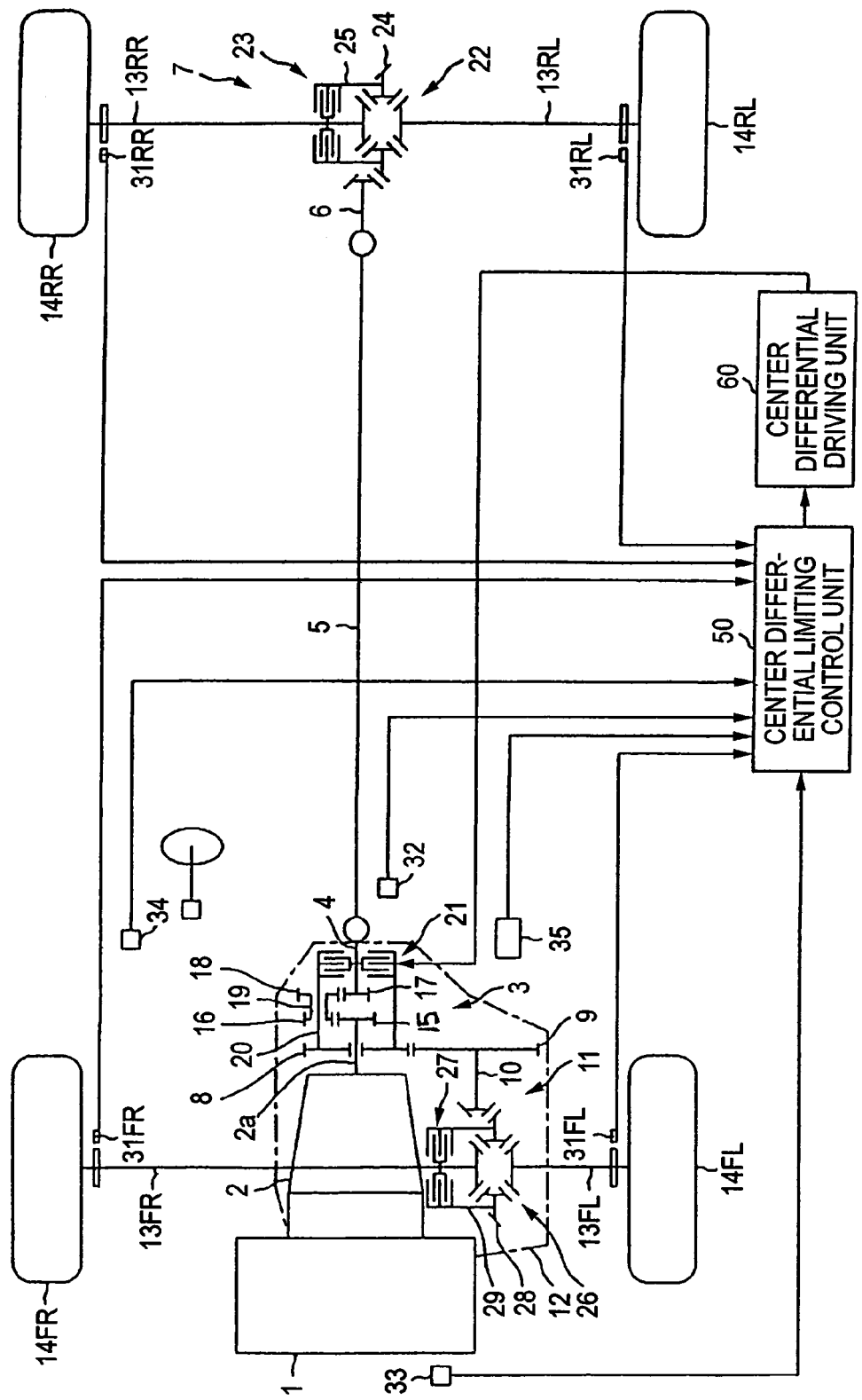
FIG. 1 is a schematic explanatory diagram of a vehicle driving force line and a center differential limiting control unit.
Figure 2:
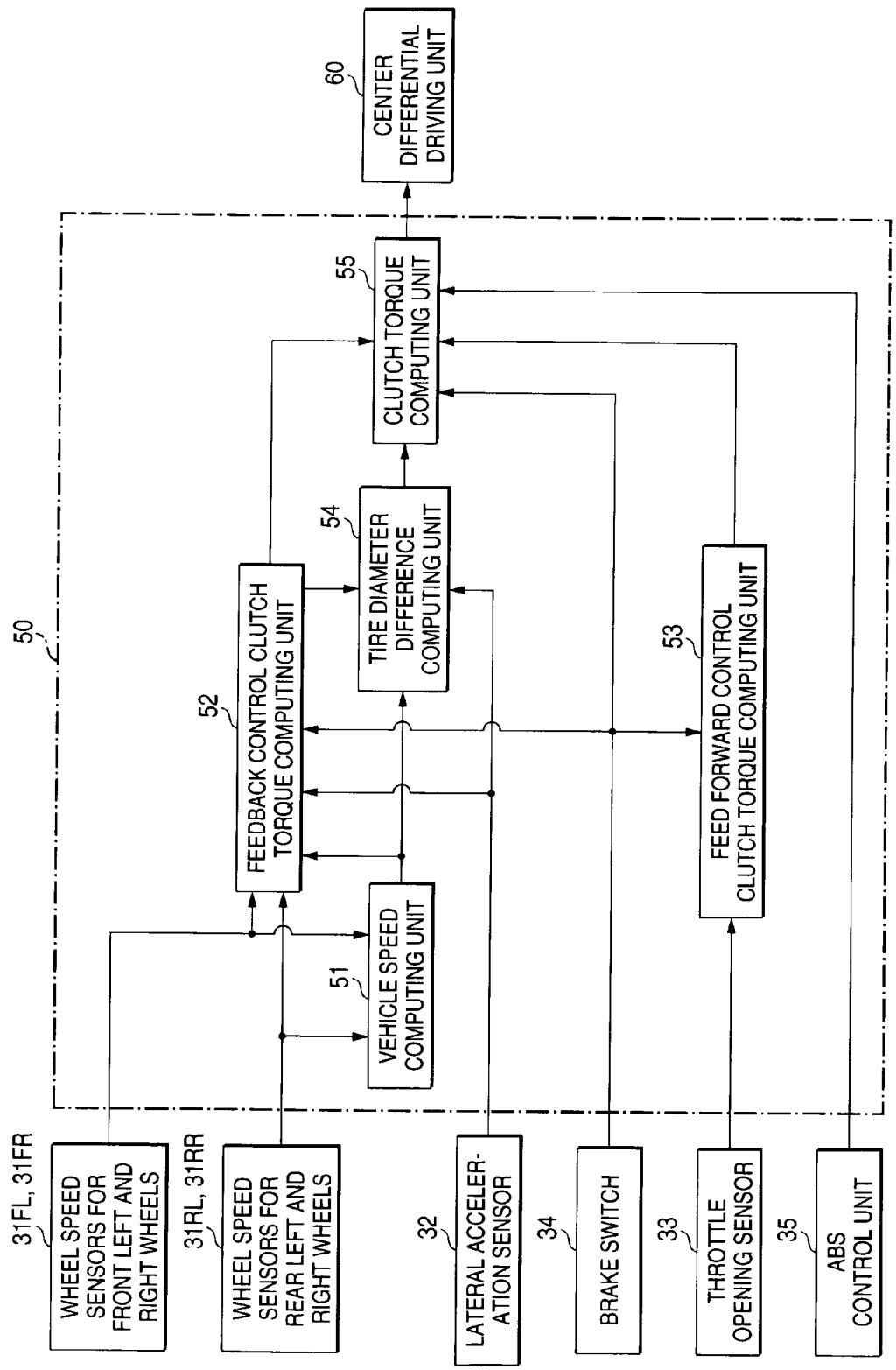
FIG. 2 is a functional block diagram of the center differential limiting control unit.
Figure 3:
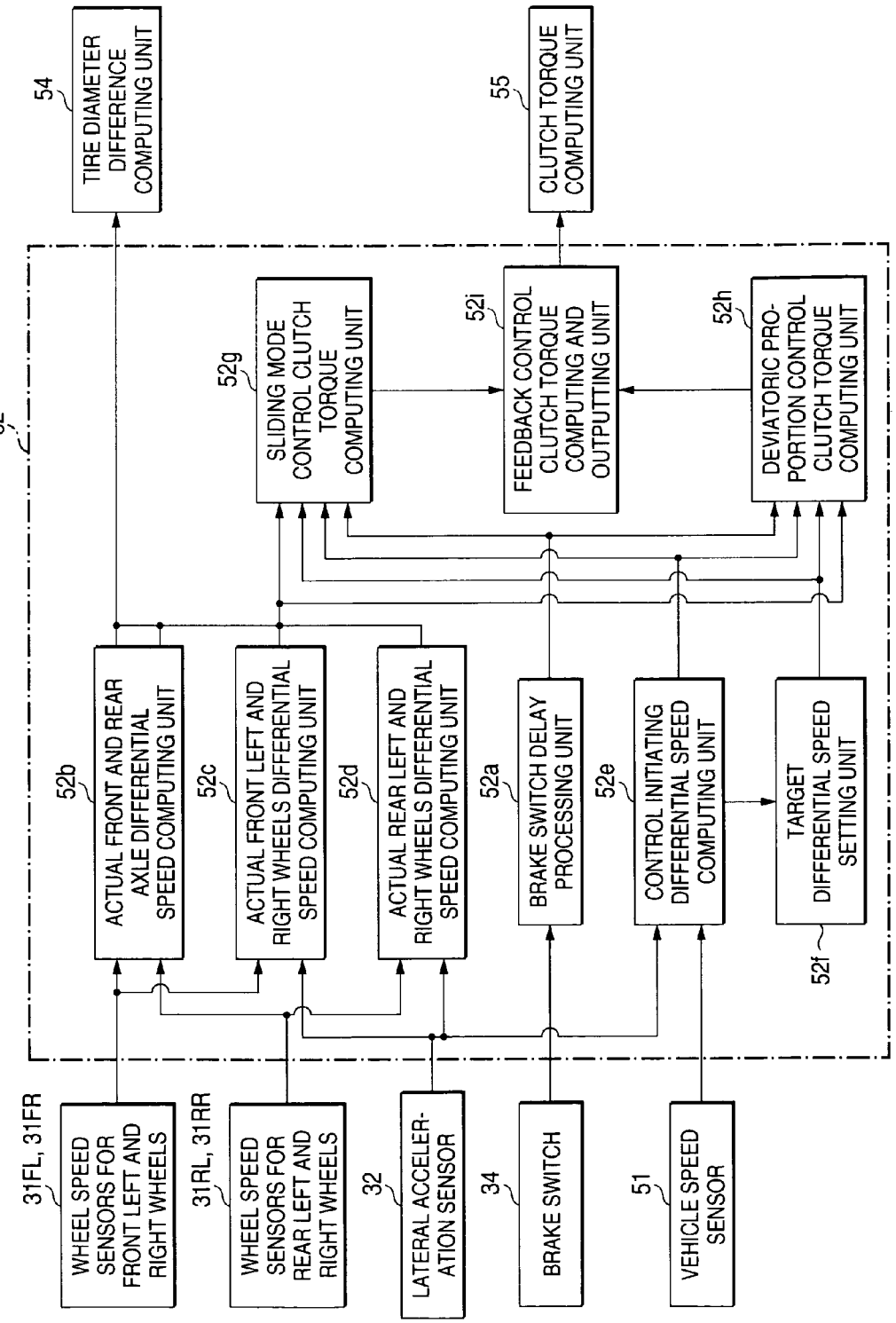
FIG. 3 is a functional block diagram of a feedback control clutch torque computing unit.
Figure 4:
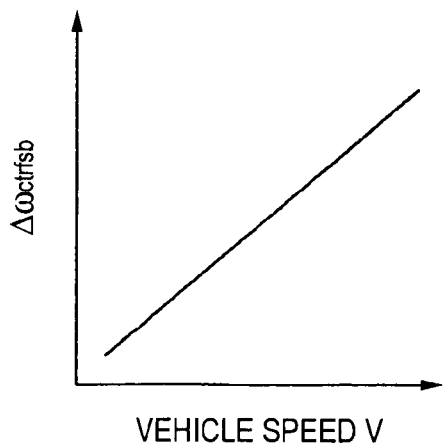
FIG. 4 is an explanatory diagram showing an example of a basic value map of a vehicle speed and a front and rear axle control initiating differential speed.
Figure 5:
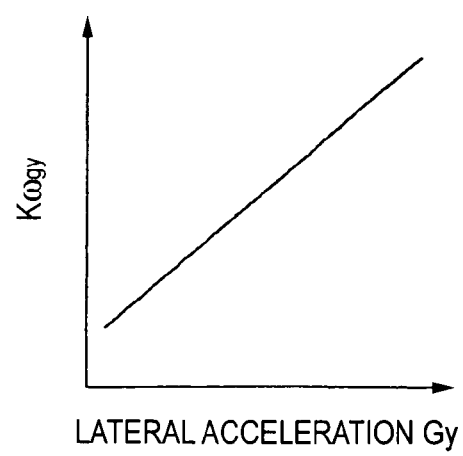
FIG. 5 is an explanatory diagram showing the example of a correction factor map of the front and rear axle control initiating differential speed based on a lateral acceleration.
Figure 6:
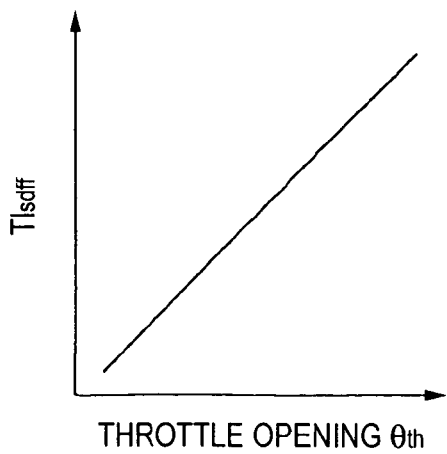
FIG. 6 is the explanatory diagram showing an example of the clutch torque set by a feed forward control clutch torque computing unit; and, FIG. 7 is the explanatory diagram showing the example of a tire diameter difference constant that is set according to an actual wheel speed difference among the four wheels.
Figure 7:
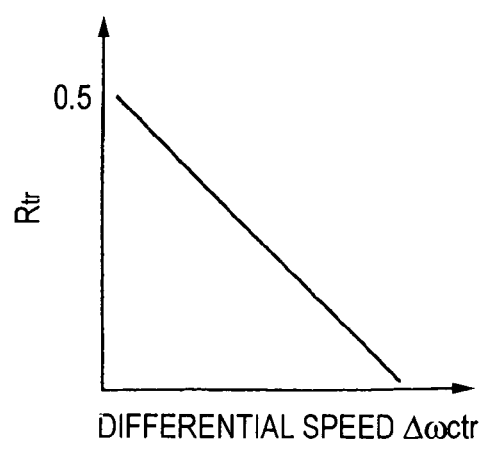

FIGS. 1 to 7 show an embodiment of the present invention, in which FIG. 1 is a schematic explanatory diagram of a vehicle driving force flow line and a center differential limiting control unit, FIG. 2 is a functional block diagram of the center differential limiting control unit, FIG. 3 is a functional block diagram of a feedback control clutch torque computing unit, FIG. 4 is an explanatory diagram showing an example of a basic value map of a vehicle speed and a front and rear axle control initiating differential speed, FIG. 5 is an explanatory diagram showing the example of a correction factor map of the front and rear axle control initiating differential speed based on a lateral acceleration, FIG. 6 is an explanatory diagram showing an example of clutch torque set by a feed forward control clutch torque computing unit, and FIG. 7 is an explanatory diagram showing an example of a tire diameter difference constant that is set according to an actual wheel speed difference among the four wheels.

In FIG. 1, reference numeral 1 denotes an engine placed at a front part of a vehicle, and a driving force generated by the engine 1 is transmitted to a center differential 3 from an automatic transmission (shown as including a torque converter) behind the engine 1 by a transmission output shaft 2a. the driving force, which exits the center differential 3 toward a rear wheel side, is then inputted into a rear final-drive differential 7 via a rear drive shaft 4, a propeller shaft 5 and a driving pinion 6, whereas the driving force which is directed toward a front wheel side is inputted into a front final-drive differential 11 via a transfer drive gear 8, a transfer driven gear 9, and a front drive shaft 10 which constitutes a drive pinion shaft portion. Here, the automatic transmission 2, the center differential 3 and the front final-drive differential 11 are provided integrally within a case 12.

The driving force inputted into the rear final-drive differential 7 is transmitted to a left rear wheel 14RL by a left drive shaft 13RL, while being transmitted to a right wheel 14RR by a right drive shaft 13RR. In addition, the driving force inputted into the front final-drive differential is transmitted to a left front wheel 14FL by a front left drive shaft 13FL, while being transmitted to a right front wheel 14FR by a front right drive shaft 13FR.

A first sun gear 15 with a large diameter is formed on the input side transmission output shaft 2a of the center differential 3, and the first sun gear 15 meshes with a first pinion 16 with a small diameter, whereby a first gear train is constituted.

In addition, a second sun gear 17 with the small diameter is formed on the rear drive shaft 4 which outputs the driving force toward the rear wheels, and the second sun gear 17 meshes with a second pinion 18 with the large diameter, whereby a second gear train is constituted.

The first pinion 16 and the second pinion 18 are formed integrally on pinion members 19, respectively, and a plurality (for example, three) of the pinion members 19 are rotatably supported on a fixed shaft provided on a carrier 20. Then, the transfer drive gear 8 is coupled to a front end of the carrier 20 for transmitting to the front wheels.

Furthermore, the transmission output shaft 2a is rotatably inserted into the carrier 20 from the front, whereas the rear drive shaft 4 is rotatably inserted into the carrier 20 from the rear, and the first sun gear 15 and the second sun gear 17 are installed in a space central within the carrier 20. Then, the respective first pinions 16 and second pinions 18 on the plurality of pinion members 19 are both caused to mesh with the first sun gear 15 and the second sun gear 17, respectively.

Thus, the first and second pinions 16, 18 and the second sun gear 17 which constitute one output side and the carrier 20 of the first and second pinions 16, 18 which constitutes the other output side are meshed with the first sun gear 15 which constitutes an input side.

The composite planetary-type center differential 3 provides a differential function by setting the numbers of teeth of the first and second sun gears 15, 17 and the plurality of first and second pinions 16, 18 that are disposed around circumferences of the sun gears 15, In addition, a basic torque distribution is made to be a desired distribution (for example, an uneven torque distribution in which the driving torque is distributed heavily on the rear wheels) by setting appropriately meshing pitch radii of the first and second pinions 16, 18 with the first and second sun gears 15, 17, respectively.

The center differential 3 allows a thrust load to remain without being cancelled by using, for example, helical gears for the first and second sun gears 15, 17 and the first and second pinion gears 16, 18, and allowing a helix angle between those of the first gear train and the second gear train to differ from each other. Furthermore, friction torques generated at ends of the pinion member 19 are set such that the friction torques are separated to the surface of the first and second pinions 16, 18 and the fixed shaft provided on the carrier 20 through meshing and are generated when a resultant force of a tangential load is applied. Thus, by allowing a differential motion limiting torque proportional to an input torque to be obtained, the center differential 3 itself is also allowed to provide a differential motion limiting function.

Moreover, a center differential clutch (a transfer clutch) 21 which adopts a hydraulic multiple disc clutch provided between the two output members or the carrier 20 and the rear drive shaft 4 of the center differential 3 for varying the distribution of the driving force between the front and rear wheels 14FL, FR, RL, RR. Then, a torque distribution between the front and rear wheels 14FL, FR, RL, RR is allowed to be controlled to vary within a range from a four wheel drive in which the front and rear axles are directly coupled from a torque distribution ratio of 50/50 to the torque distribution ratio (of, for example, 35/65 front and rear) by controlling the engagement force of the transfer clutch 21.

The transfer clutch 21 is connected to a center differential clutch driving unit 60 including a hydraulic circuit incorporating therein a plurality of solenoid valves, whereby the transfer clutch 21 is disengaged and engaged by a hydraulic pressure generated by the center differential clutch driving unit 60. Then, control signals (output signals directed to the respective solenoid valves) for driving the center differential clutch driving unit 60 are outputted from a center differential limiting control unit 50 as described below.

On the other hand, the rear final-drive differential 7 includes a bevel gear type differential mechanism unit 22 and a rear differential clutch 23 which adopts a hydraulic multiple disc clutch for limiting a differential motion between the left and right wheels. The rear differential clutch 23 is provided between a differential case 25 to which a ring gear 24 with which a drive pinion 6 is allowed to mesh is fixed and a rear wheel right drive shaft 13RR.

In addition, similarly, the front final-drive differential 11 includes a bevel gear type differential mechanism unit 26 and a front differential clutch 27 which adopts the hydraulic multiple disc clutch for limiting the differential motion between the left and right wheels. The front differential clutch 27 is provided between a differential case 29 to which a ring gear 28 with which the drive pinion of the front drive shaft 10 is allowed to mesh is fixed and a front wheel right drive shaft 13FR.

Signals inputted into the center differential limiting control unit 50 from respective sensors as described below.

Namely, wheel speeds of the respective wheels 14FL, 14FR, 14RL, 14RR are detected by wheel speed sensors 31FL, 31FR, 31RL, 31RR, respectively, and are then inputted into the center differential limiting control unit 50. In addition, a lateral acceleration Gy generated in the vehicle and an opening angle θth of a throttle valve of the engine are inputted into the center differential limiting control unit 50 from a lateral acceleration sensor 32 and the a throttle opening sensor 33, respectively. Furthermore, an ON-OFF signal from a brake switch 34 is also inputted into the center differential limiting control unit 50. In addition, a known anti-lock brake system (ABS) for preventing to lock the wheels 14FL, FR, RL, RR when brakes are applied is also installed in the vehicle, a signal from an ABS control unit 35 which indicates the operating conditions of the ABS (a signal that is switched on when the ABS operates) is also inputted into the center differential limiting control unit 50.

The center differential limiting control unit 50 has a micro computer and its peripheral circuit and includes, as shown in FIG. 2, mainly a vehicle speed computing unit 51, a feedback control clutch torque computing unit 52, a feed forward control clutch torque computing unit 53, a tire diameter difference computing unit 54 and a clutch torque computing unit 55.

Wheel speeds ωfl, ωfr, ωrl, ωrr of the respective wheels 14FL, 14FR, 14RL, 14RR are inputted in to the vehicle speed computing unit 51 from wheel speed sensors of the four wheels 14FL, FR, RL, RR or the respective wheel speed sensors 31FL, 31FR, 31RL, 31RR. The vehicle speed computing unit 51 computes a vehicle speed V (=(ωfl, ωfr, ωr, ωrr)/4) by, for example, computing an average of the wheel speeds and output the vehicle speed to the feedback control clutch torque computing unit 52 and the tire diameter difference computing unit 54.

The wheel speeds ωfl, ωfr, ωrl, ωrr of the respective wheels 14FL, 14FR, 14RL, 14RR, a lateral acceleration Gy, a brake switch signal and a vehicle speed V are inputted into the feedback control clutch torque computing unit 52 from the respective wheel speed sensors 31FL, 31FR, 31RL, 31RR, the lateral acceleration sensor 32, the brake switch, and the vehicle speed computing unit 51, respectively.

The feedback control clutch torque computing unit 52 is such as to be provided as a feedback control clutch torque computing unit, and to be specific, as will be described later on, the feedback control clutch torque computing unit 52 computes a front and rear axle target differential speeds Δωctrft, Δωctrrt, a target front left and right wheel differential speed ΔωFtt, and a target rear left and right wheel differential speed ΔωRrt so as to compute front and rear axle differential speeds Δωctrf, Δωctrr, an actual front left and right wheel differential speed ΔωFt and an actual rear left and right wheel differential speed ΔωRr. Then, a clutch torque Tlsdfb is computed by obtaining deviations εctrf, εctrr, εFt, εRr, with a switching function by using a polarity related to at least an integral term of each deviation, applying a sliding mode control, and furthermore, taking into a consideration of deviation amount which is proportional thereto.

Namely, as shown in FIG. 3, the feedback control clutch torque computing unit 52 includes mainly a brake switch delay processing unit 52a, an actual front and rear axle differential speed computing unit 52b, an actual front left and right wheel differential speed computing unit 52c, an actual rear left and right wheel differential speed computing unit 52d, a control initiating differential speed computing unit 52e, a target differential speed setting unit 52f, a sliding mode control clutch torque computing unit 52g, a deviation computing unit 52h and a feedback torque computing unit 52i.

An ON-OFF signal is inputted into the brake switch delay processing unit 52a from the brake switch 34, and in order to prevent hunting, a predetermined short delay time is set when the brake switch 34 is switched from an ON state to an OFF state, whereby the brake switch 34 is put in the OFF state only after the delay time has elapsed when the brake switch 34 is switched from the ON state to the OFF state (note that no delay processing is implemented when the brake switch 34 is switched from the OFF state to the ON state). A brake switch signal processed at the brake switch delay processing unit 52a is outputted to the sliding mode control clutch torque computing unit 52g and the deviation computing unit 52h.

The wheel speeds ωfl, ωfr, ωrl, ωrr of the respective wheels 14FL, 14FR, 14RL, 14RR are inputted into the actual front and rear axle differential speed computing unit 52b from the respective wheel speed sensors 31FL, 31FR, 31RL, 31RR, respectively. Then, two types of actual front and rear axle differential speeds Δωctrf, Δωctrr are computed from the wheel speeds ωfl, ωfr, ωrl, ωrr so inputted using by the following equations (1), (2).

$$\Delta\omega ctrf = ((\omega fl + \omega fr) - (\omega rl + \omega rr))/2 \tag{1}$$

$$\Delta\omega ctrr = ((\omega rl + \omega rr) - (\omega fl + \omega fr))/2 \tag{2}$$

At this time, in the event that the speed of the front axle is faster than that of the rear axle, Δωctrf becomes a positive value, and Δωctrr becomes a negative value, whereas in the event that the speed of the front axle is slower than that of the rear axle, in contrast, Δωctrf becomes a negative value, and Δωctrr becomes a positive value. The actual front and rear axle differential speeds Δωctrf, Δωctrr so computed are then outputted to the sliding mode control clutch torque computing unit 52g and the deviation control clutch torque computing portion 52h. In addition, the actual front and rear axle differential speeds Δωctrf, Δωctrr are also outputted to the tire diameter difference computing unit 54. Note that the reason why the two types of the actual front and rear axle differential speeds Δωctrf, Δωctrr are computed is that in computation of a clutch torque, which will be described later on, a clutch torque is set. A torque is transmitted to the axle of a faster speed from the axle of a slower speed depending on whether the actual front and rear axle differential speeds Δωctrf, Δωctrr become positive or negative.

The wheel speeds ωfl, ωfr of the left and right front wheels 14FL, 14FR and a lateral acceleration Gy are inputted into the actual front left and right wheel differential speed computing unit 52c from the wheel speed sensors 31FL, 31FR of the left and right front wheels 14FL, FR and the lateral acceleration sensor 32, and the actual front left and right wheel differential speed computing unit 52c then computes an actual differential speed ΔωFt according to turning conditions (including the condition in which the vehicle runs straight) of the vehicle by using any of the following equations (3), (4), and (5). At this time, a turning condition of the vehicle is determined by the lateral acceleration Gy: in the event that an absolute value |Gy| is equal to or smaller than a predetermined value Ays which has been set in advance, the vehicle is determined as running substantially straight, in the event that the lateral acceleration Gy is larger than Ays, the vehicle is determined as turning left, and in the event that the lateral acceleration Gy is smaller than −Ays, the vehicle is determined as turning right. Note that the turning conditions of the vehicle can be determined by any other unit such as a yaw rate and a steering angle, and therefore, these are so determined.

$$\text{When turning right} \ldots \Delta\omega Ft = \omega fr - \omega fl \tag{3}$$

$$\text{When turning left} \ldots \Delta\omega Ft = \omega fl - \omega fr \tag{4}$$

$$\text{When running substantially straight} \ldots \Delta\omega Ft = |\omega fr - \omega fl| \tag{5}$$

Note that since the wheel speed of the outside wheel becomes faster than the wheel speed of the inside wheel in a condition in which both the left and right front wheels 14FL, FR do not slip, actual differential speeds ΔωFt obtained by equations (3) and (4) become negative values. Thus, the actual differential speeds ΔωFt between the left front wheel 14FL and right front wheel 14FR so obtained is then outputted to the sliding mode control clutch torque computing unit 52g and the deviation control clutch torque computing unit 52h.

The wheel speeds ωrl, ωrr of the left and right rear wheels 14RL, 14RR and a lateral acceleration Gy are inputted into the actual rear left and right wheel differential speed computing unit 52d from the wheel speed sensors 31RL, 31RR of the left and right rear wheels and the lateral acceleration sensor 32. And the actual rear left and right wheel differential speed computing unit 52d then computes an actual differential speed ΔωRr according to turning conditions (including a condition in which the vehicle runs straight) of the vehicle by using any of the following equations (6), (7), and (8). At this time, the turning condition of the vehicle is determined by the lateral acceleration Gy as with the actual front left and right wheel differential speed computing unit 52c. In the event that the absolute value |Gy| of the lateral acceleration is equal to or smaller than the predetermined value Ays which has been set in advance, the vehicle is determined as running substantially straight. In the event that the lateral acceleration Gy is larger than Ays, the vehicle is determined as turning left, and in the event that the lateral acceleration Gy is smaller than −Ays, the vehicle is determined as turning right. Note that the turning conditions of the vehicle can be determined by any other unit such as the yaw rate or the steering angle, and therefore, these are so determined.

When turning right ... $\Delta \omega Rr = \omega rr - \omega rl$ (6)

When turning left ... $\Delta \omega Rr = \omega rl - \omega rr$ (7)

When running substantially straight ... $\Delta \omega Rr = |\omega rr - \omega rl|$ (8)

Note that the actual differential speeds ΔωRr obtained by equations (6) and (7) become negative values, since the wheel speed of the outside wheel becomes faster than that of the inside wheel in a condition in which both the left and right rear wheels do not slip. Thus, an actual differential speeds ΔωRr between the left rear wheel 14RL and right rear wheel 14RR so obtained is then outputted to the sliding mode control clutch torque computing unit 52g and the deviation control clutch torque computing unit 52h.

The actual front and rear axle differential speed computing unit 52b, the actual front left and right wheel differential speed computing unit 52c and the actual rear left and right wheel differential speed computing unit 52d are provided as actual differential speed detecting unit in the feedback control clutch torque computing unit.

The lateral acceleration Gy and a vehicle speed V are inputted into the control initiating differential speed computing unit 52e from the lateral acceleration sensor 32 and the vehicle speed computing unit 51, respectively. The control initiating differential speed computing unit 52e then computes and sets a control initiating differential speed (a front and rear axle control initiating differential speed Δωctrfs) which constitutes a lower limit value of an actual differential speed of the actual differential speed Δωctrfs between the front and rear axles according to vehicle speed V and the lateral acceleration Gy while referring to a map set in advance. In addition, the control initiating differential speed computing unit 52e also computes and sets a control initiating differential speed (a front and rear axle control initiating differential speed Δωctrrs) which constitutes a lower limit value of the actual differential speed of the actual differential speed Δωctrrs between the front and rear axles while referring to the map set in advance. Furthermore, the control initiating differential speed computing unit 52e also sets certain values CFts, CRrs which have been set in advance as control initiating differential speeds (a front-wheel side control initiating differential speed ΔωFts, a rear-wheel side control initiating differential speed ΔωRrs) which constitutes lower limit values of the actual differential speeds ΔωFt between the left front wheel 14FL and the right front wheel 14FR and the actual differential speed ΔωRr between the left rear wheel 14RL and the right rear wheel 14RR, respectively.

In setting the front and rear axle control initiating differential speed Δωctrfs in a manner as described above, first, a basic value Δωctrfsb of the front and rear axle control initiating differential speed Δωctrfs on the basis of a current vehicle speed from a basic value map of vehicle speed and front and rear axle control initiating differential speed Δωtrfs as shown in FIG. 4. In addition, a correction coefficient kωgy of the front and rear axle control initiating differential speed Δωctrfs is obtained on the basis of a current lateral acceleration Gy from the map, as shown in FIG. 5, of correction coefficient of the front and rear axle control initiating differential speed Δωctrfs on the basis of the lateral acceleration Gy. Then, the basic value so set is multiplied by the correction coefficient kωgy so obtained to compute a final front and rear axle control initiating differential speed Δωctrfs (=Δωctrfsb·kωgy).

At this time, while the front and rear axle control initiating differential speed Δωctrfs is set so as to increase as the vehicle speed becomes faster in the map in FIG. 4, this is intended to relax the threshold value as the vehicle speed increases and to ease the degree of the engagement as the vehicle speed increases to thereby attempt to attain an improved fuel economy. In addition, while the front and rear axle control initiating differential speed Δωctrfs is set so as to increase as the lateral acceleration Gy increases in the map in FIG. 5, this is intended to moderate the threshold value as the lateral acceleration Gy increases and to relieve the degree of the engagement as the lateral acceleration Gy increases to thereby improve the turning performance of the vehicle.

While not specifically shown, the front and rear axle control initiating differential speed Δωctrrs is also set by the map as shown in FIG. 5 in which the front and rear axle control initiating differential speed Δωctrrs is set so as to increase as the lateral acceleration Gy increases.

Here, the respective control initiating differential speeds Δωctrfs, Δωctrrs, ΔωFts, ΔωRrs are, as described below, the threshold values which determine an extent to which the differential limiting control is allowed to be implemented between the front and rear axles, the left and right front wheels and the left and right rear wheels. In the event that the actual differential speeds Δωctrf, Δωctrr, ΔωFt, ΔωRr are smaller than the control initiating differential speedsΔωctrfs, Δωctrrs, ΔωFts, ΔωRrs, the engagement torque relative to the transfer clutch 21 is made to be 0. In particular, between the front and rear axles, the differential speed that is actually to be controlled becomes too small. Therefore, the transfer clutch 21 is coupled in a stationary friction condition, and the control of the transfer clutch 21 is put in a slip-lock condition, whereby the convergence of the control becomes slow and the control stability is deteriorated. Thus, the control initiating differential speed is set in order to prevent the occurrence of the delayed convergence of the control, as well as the deteriorated control stability. In addition, between the left and right front wheels and left and right rear wheels, in the event that the control initiating differential speeds ΔωFts, ΔωRrs are set at, for example, 0, respectively, when the wheel speed of the inside wheels exceeds the wheel speed of the outside wheel. The differential limiting control of the center differential is implemented without any delay, whereas in any other cases, the front differential clutch 27 and the rear differential clutch 23 are in normal operation, the differential limiting control of the center differential is controlled and set so as not to interfere with the control of the differentials.

Note that while the same differential speed may be such as to be set by taking into consideration a torque that is inputted into the center differential 3 (a center differential input torque), or the front and rear axle control initiating differential speed Δωctrfs may be set so as to be changed selectively according to the preference of the driver, the front and rear axle control initiating differential speed Δωctrfs is designed to be set according to the vehicle speed V and the lateral acceleration Gy in this embodiment. Furthermore, depending on the specifications of the vehicle, the front and rear axle control initiating differential speed Δωctrfs may be set according to only any of these parameters or a combination of a plurality of parameters (for example, a combination of the lateral acceleration Gy and the center differential input torque) or the same differential speed may be a constant value.

Similarly, while the front and rear axle control initiating differential speed Δωctrrs is designed to be set according to the lateral acceleration Gy in this embodiment, the same differential speed may be such as to be set according to the vehicle speed V, the center differential input torque or the preference of the driver. In addition, depending on the specifications of the vehicle, the front and rear axle control initiating differential speed Δωctrrs may be set according to only any of the other parameters than the lateral acceleration Gy or the combination of the plurality of parameters (for example, the combination of the lateral acceleration Gy and the center differential input torque), or the same differential speed may be the constant value.

In addition, while the front-wheel side control initiating differential speed ΔωFts and the rear-wheel side control initiating differential speed ΔωRrs are designed to be set at the constant values in the embodiment, these may be set according to one of the other parameters which indicate the behaviors of the vehicle or the plurality of such parameters, as with the front and rear axle control initiating differential speeds Δωctrfs, Δωctrrs.

The respective control initiating differential speeds Δωctrfs, Δωctrrs, ΔωFts, ΔωRrs which are computed and are then outputted to the target differential speed setting unit 52*f*, the sliding mode control clutch torque computing unit 52*g* and the deviation control clutch torque computing unit 52*h*.

When the respective control initiating differential speeds Δωctrfs, Δωctrrs, ΔωFts, ΔωRrs are inputted thereinto from the control initiating differential speed computing unit 52*e*, the target differential speed setting unit 52*f* computes front and rear axle target differential speeds Δωctrft, Δωtrrt, a target front differential speed ΔωFtt and a target rear differential speed ΔωRrt on the basis of the respective control initiating differential speeds Δωctrfs, Δωctrrs, ΔωFts, ΔωRrs by using the following equations (9), (10), (11) and (12).

$$\Delta\omega ctrft = \Delta\omega ctrfs + Cctrft \tag{9}$$

$$\Delta\omega trrt = \Delta\omega ctrrs + Cctrrt \tag{10}$$

$$\Delta\omega Ftt = \Delta\omega Fts + CFtt \tag{11}$$

$$\Delta\omega Rrt = \Delta\omega Rrs + CRrt \tag{12}$$

where, Cctrft, Cctrrt, CFtt and CRr are constants set in advance on the basis of calculations and experiments. The respective target differential speeds Δωctrft, Δωtrrt, ΔωFtt, ΔωRrt set as described above are then outputted to the sliding mode control clutch torque computing unit 52*g* and the deviation control clutch torque computing unit 52*h*. Thus, the control initiating differential speed computing unit 52*e* and the target differential speed setting unit 52*f* are provided as a target differential speed setting unit in the feedback control clutch torque computing unit.

Inputted into the sliding mode control clutch torque computing unit 52*g* are a delay-processed brake switch signal from the brake switch delay processing unit 52*a*, actual front and rear axle differential speeds Δωctrf, Δωtrr from the actual front and rear axle differential speed computing unit 52*b*, an actual differential speed ΔωFt between the left front wheel 14FL and the right front wheel 14FR from the actual front left and right wheel differential speed computing unit 52*c*, an actual differential speed ΔωRr between the left rear wheel 14RL and the right rear wheel 14RR from the actual rear left and right wheel differential speed computing unit 52*d*, respective control initiating differential speeds Δωctrfs, Δωtrrs, ΔωFts, ΔωRrs from the target differential speed computing unit 52*e*, and respective target differential speeds Δωctrft, Δωtrrt, ΔωFtt, ΔωRrt from the target differential speed setting unit 52*f*. Then, the sliding mode control clutch torque computing unit 52*g* computes a clutch torque of the transfer clutch 21 by obtaining a deviation between the target differential speed and the actual differential speed for each speed, with a switching function by using at least a polarity related to an integral term of the deviation so obtained and applying the sliding mode control.

Namely, the deviation between the target differential speed and the actual differential speed for each speed can be computed as below.

Differential speed deviation between the front and rear axle εctrf=Δωctrf−Δωctrft (13)

Differential speed deviation between the front and rear axle εctrr=Δωctrr−Δωctrrt (14)

Differential speed deviation between the left front wheel and the right front wheel εFt=ΔωFt−ΔωFtt (15)

Differential speed deviation between the left rear wheel and the right rear wheel εRr=ΔωRr−ΔωRrt (16)

Then, clutch torques T SMCctrf, T SMCctrr, T SMCFt, T SMCRr applied to the transfer clutch 21 through a sliding mode control for each speed are computed by using the following switching function equations (17), (20), (23) and (26).

First, setting a clutch torque T SMCctrf through the sliding mode control utilizing the front and rear axle differential speed deviation εctrf is described.

$$T\ SMCctrf = sat(x\ ctrf) \tag{17}$$

however, when x ctrf>0, T SMCctrf=sat (x ctrf)=x ctrf
when x ctrf≦0, T SMCctrf=sat (x ctrf)=0

$$x\ ctrf = k\ wctrf \cdot Jw \cdot (d\ \epsilon ctrf/dt) + Tsg \cdot (sctrf/(|sctrf|+\delta)) \tag{18}$$

where, $$s\ ctrf = \epsilon ctrf + ki \cdot \int (\epsilon ctrf) dt \tag{19}$$

(however, the integral range is from 0 to t)

In addition, k wctrf is a differential term gain, and when (d εctrf/dt)>0, it is made to be k wu, and when (d εctrf/dt)≦0, the differential term gain is made to be k wd. Furthermore, Jw is an inertia term, Tsg is a switching gain, δ is a chattering prevention constant, and ki is an integral term gain.

Then, in case the actual differential speed Δωctrf becomes less than the control initiating differential speed Δωctrfs, the differential speed that is actually to be controlled becomes too small, and therefore the transfer clutch 21 is coupled in a stationary friction condition and the control of the transfer clutch 21 is put in a slip-lock condition, whereby the convergence of the control becomes slow and the control stability is deteriorated. Thus, in order to prevent the occurrence of the delayed control convergence and the deteriorated control stability, the clutch torque T SMCctrf is made to be 0, and furthermore, the integral value is also reset (∫(єctrf)dt=0: however, the integral range is from 0 to t). In addition, even when an ON signal of the brake switch is inputted, in order to avoid the interference with a brake condition, the clutch torque T SMCctrf is similarly made to be 0 and the integral value is also reset.

Next, setting a clutch torque T SMCctrr through the sliding mode control utilizing the front and rear axle differential speed deviation єctrr will be described.

$$T\ SMCctrr = sat(x\ ctrr) \quad (20)$$

however, when x ctrr>0, T SMCctrr=sat (x ctrr)=x ctrr
when x ctrr≦0, T SMCctrr=sat (x ctrr)=0

$$x\ ctrr = k\ wctrr \cdot Jw \cdot (d\ \epsilon ctrr/dt) + Tsg \cdot (sctrr/(|sctrr|+\delta)) \quad (21)$$

where, $$s\ ctrr = \epsilon ctrr + ki \cdot \int (\epsilon ctrr) dt \quad (22)$$

(however, the integral range is from 0 to t)

In addition, k wctrr is a differential term gain, and when (d єctrr/dt)>0, it is made to be k wu, and when (d єctrr/dt)≦0, the differential term gain is made to be k wd. Furthermore, Jw is an inertia term, Tsg is a switching gain, δ is the chattering prevention constant, and ki is the integral term gain.

Then, in case the actual differential speed Δωctrr becomes less than the control initiating differential speed Δωctrrs, the differential speed that is actually to be controlled becomes too small, and therefore the transfer clutch 21 is coupled in the stationary friction condition and the control of the transfer clutch 21 is put in the slip-lock condition, whereby the convergence of the control becomes slow and the control stability is deteriorated. Thus, in order to prevent the occurrence of the delayed control convergence and the deteriorated control stability, the clutch torque T SMCctrr is made to be 0, and furthermore, the integral value is also reset (∫(єctrr)dt=0: however, the integral range is from 0 to t). In addition, even when an ON signal of the brake switch is inputted, in order to avoid the interference with a brake condition so produced, the clutch torque T SMCctrr is similarly made to be 0 and the integral value is also reset.

Next, setting a clutch torque T SMCFt through the sliding mode control utilizing the front left and right wheel differential speed deviation єFt.

$$T\ SMCFt = sat(x\ Ft) \quad (23)$$

however, when x Ft>0, T SMCFt=sat (x Ft)=x Ft
when x Ft≦0, T SMCFt=sat (x Ft)=0

$$x\ Ft = k\ wFt \cdot Jw \cdot (d\ \epsilon Ft/dt) + Tsg \cdot (s\ Ft/(|s\ Ft|+\delta)) \quad (24)$$

where, $$s\ Ft = \epsilon Ft + ki \cdot \int (\epsilon Ft) dt \quad (25)$$

(however, the integral range is from 0 to t)

In addition, k wFt is the differential term gain, and when (dєFt/dt)>0, it is made to be kwu, and when (dєFt/dt)≦0, the differential term gain is made to be k wd. Furthermore, Jw is the inertia term, Tsg is the switching gain, δ is the chattering prevention constant, and ki is the integral term gain.

Then, in case the actual front left and right wheel differential speed ΔωFt becomes lower than the control initiating differential speed ΔωFts, it is determined that the resulting condition can sufficiently be dealt with through the control of the front differential clutch 27, and the clutch torque T SMCFt is made to be so that the control of the transfer clutch 21 does not come into interference with the control of the front differential clutch 27 more than required, and furthermore, the integral value is also reset (∫(єFt)dt=0: however, the integral range is from 0 to t). In addition, even when an ON signal is inputted from the brake switch, in order to avoid the interference with the brake condition so produced, similarly, the clutch torque T SMCFt is made to be 0, and the integral value is reset.

Next, setting a clutch torque T SMCRr through the sliding mode control utilizing the rear left and right wheel differential speed deviation єRr.

$$T\ SMCRr = sat(x\ Rf) \quad (26)$$

however, when x Rr>0, T SMCRr=sat (x Rr)=x Rr
when x Rr≦0, T SMCrr=sat (x Rr)=0

$$x\ Rr = k\ wRr \cdot Jw \cdot (d\ \epsilon Rr/dt) + Tsg \cdot (s\ Rr/(|s\ Rr|+\delta)) \quad (27)$$

where, $$s\ Rr = \epsilon Rr + ki \cdot \int (\epsilon Rr) dt \quad (28)$$

(however, the integral range is from 0 to t)

In addition, k wRr is the differential term gain, and when (d єRr/dt)>0, it is made to be kwu, and when (d єRr/dt)≦0, the differential term gain is made to be k wd. Furthermore, Jw is the inertia term, Tsg is the switching gain, δ is the chattering prevention constant, and ki is the integral term gain.

Then, in case the actual rear left and right wheel differential speed ΔωRr becomes lower than the control initiating differential speed ΔωRrs, it is determined that the resulting condition can sufficiently be dealt with through the control of the rear differential clutch 23, and the clutch torque T SMCRr is made to be so that the control of the transfer clutch 21 does not come into interfering with the control of the rear differential clutch 23 more than required, and furthermore, the integral value is also reset (∫(єRr)dt=0: however, the integral range is from 0 to t). In addition, even when the ON signal is inputted from the brake switch, in order to avoid the interference with the brake condition so produced, similarly, the clutch torque T SMCRr is made to be 0, and the integral value is reset.

Thus, in the sliding control mode according to the embodiment, the switching function uses the polarity concerning the integral term of the deviation. Namely, in the switching function equation (18), the polarity concerning the integral term is obtained by dividing the integral term s ctrf by (|s ctrf|+δ), in the switching function equation (21), the polarity concerning the integral term is obtained by dividing the integral term s ctrr of the deviation by (|s ctrr|+δ), in the switching function equation (24), the polarity concerning the integral term is obtained by dividing the integral term sFt of the deviation by (|sFt|+δ), and in the switching function equation (27), the polarity concerning the integral term is obtained by dividing the integral term sRr of the deviation by (|sRr|+δ). Note that δ is also made to be a value which prevents a division by 0. Accordingly, even if values of the respective integral terms are small, irrespective of the smallness of the values, the values are used in implementing a sliding mode control so as to set the clutch torque, whereby it is possible to deal with a high response, thereby making it possible to realize a traction performance with a high accuracy and a good response.

Thus, the respective clutch torques T SMCctrf, T SMCctrr, T SMCFt, T SMCRr are outputted to the feedback control clutch torque computing unit 52.

Inputted into the deviation control clutch torque computing unit 52h are a delay-processed brake switch signal from the brake switch delay processing unit 52a, actual front and rear axle differential speeds Δωctrf, Δωtrr from the actual front and rear axle differential speed computing unit $52b$, an actual differential speed $\Delta\omega Ft$ between thereof the left front wheel 14FL and the right front wheel 14FR from the actual front left and right wheel differential speed computing unit $52c$, an actual differential speed $\Delta\omega Rr$ between the left rear wheel 14RL and the right rear wheel 14RR from the actual rear left and right wheel differential speed computing unit $52d$, respective control initiating differential speeds $\Delta\omega ctrfs$, $\Delta\omega trrs$, $\Delta\omega Fts$, $\Delta\omega Rrs$ from the target differential speed computing unit $52e$, and respective target differential speeds $\Delta\omega ctrft$, $\Delta\omega trrt$, $\Delta\omega Ftt$, $\Delta\omega Rrt$ from the target differential speed setting unit $52f$. Then, the deviation torque computing unit $52h$ obtains a deviation between the target differential speed and the actual differential speed for each speed and computes proportional components of the clutch torque (clutch torques T pcctrf, T pctrr, T pcFt, TpcRf) which allow the actual differential speed to converge on the target differential speed according to the deviation so obtained.

Namely, the deviation between the target differential speed and the actual differential speed for each speed can be computed as below.

Differential speed deviation between the front and rear axle $\epsilon pctrf=\Delta\omega ctrf-\Delta\omega ctrft-(\Delta\omega ctrft-\Delta\omega ctrfs)$ (29)

Differential speed deviation between the front and rear axle $\epsilon pctrr=\Delta\omega ctrr-\Delta\omega ctrrt-(\Delta\omega ctrrt-\Delta\omega ctrrs)$ (30)

Differential speed deviation between the left front wheel and the right front wheel $\epsilon pFt=\Delta\omega Ft-\Delta\omega Ftt-(\Delta\omega Ftt-\Delta\omega Fts)$ (31)

Differential speed deviation between the left rear wheel and the right rear wheel $\epsilon pRr=\Delta\omega Rr-\Delta\omega Rrt-(\Delta\omega Rrt-\Delta\omega Rrs)$ (32)

Then, the clutch torques T pcctrf, T pcctrr, T pcFt, T pcRr provided through the deviation control are calculated as follows.

First, the clutch torque T pcctrf provided through the deviation control utilizing the front and rear axle differential speed deviation $\epsilon pctrf$ is calculated as below:

in the event of $\epsilon pctrf>0$, T pcctrf=kp1·$\epsilon pctrf$+kp2·$\Delta\omega ctrf$,
in the event of $\epsilon pctrf\leq 0$, T pcctrf=kp2·$\Delta\omega ctrf$.

Next, the clutch torque T pcctrr provided through the deviation control utilizing the front and rear axle differential speed deviation $\epsilon pctrr$ is calculated as below:

in the event of $\epsilon pctrr>0$, T pcctrr=kp1·$\epsilon pctrr$+kp2·$\Delta\omega ctrr$,
in the event of $\epsilon pctrr\leq 0$, T pcctrr=kp2·$\Delta\omega ctrr$.

Next, the clutch torque T pcFt provided through the deviation control utilizing the front left and right wheel differential speed deviation $\epsilon pFt$ is calculated as below:

in the event of $\epsilon pFt>0$, T pcFt=kp1·$\epsilon pFt$+kp2·$\Delta\omega Ft$,
in the event of $\epsilon pFt\leq 0$, T pcFt=$\Delta\omega Ft$.

Next, the clutch torque T pcRr provided through the deviation control utilizing the rear left and right wheel differential speed deviation $\epsilon pRr$ is calculated as below:

in the event of $\epsilon pRr>0$, T pcRr=kp1·$\epsilon pRr$+kp21·$\Delta\omega Rr$,
in the event of $\epsilon pRr\leq 0$, T pcRr=$\Delta\omega Rr$, where kp1 is a first proportion term gain, and kp2 is a second proportion term gain.

In addition, the respective clutch torques T pcctrf, T pcctrr, T pcFt and T pcRr provided by the deviation control are set at 0 when the ON signal is inputted from the brake switch so as to avoid the interference with the brake condition produced by the singal.

Thus, the respective clutch torques T pcctrf, T pcctrr, T pcFt and T pcRr which are computed at the deviation control clutch torque computing unit $52h$ are then outputted to the feedback control clutch torque computing and outputting unit $52i$.

Inputted into the feedback control clutch torque computing and outputting unit $52i$ are respective clutch torques T SMCctrf, T SMCctrr, T SMCFt and T SMCRr from the sliding mode control clutch torque computing unit $52g$ and respective clutch torques T pcctrf, T pcctrr, T pcFt and T pcRr from the deviation control clutch torque computing unit $52h$.

Then, as will be described below, four corresponding clutch torques T ctrf, T ctrr, T Ft and T Rf are obtained through an addition, and a maximum value of the torque so obtained is set as a final clutch torque T lsdfb provided to the transfer clutch 21 through a feedback control, the clutch torque T lsdfb being then outputted to the clutch torque computing unit 55.

Namely, $T\ ctrf = T\ SMCctrf + T\ pcctrf$ $T\ ctrr = T\ SMCctrr + T\ pcFt$ $T\ Ft = T\ SMCFt + T\ pcFt$ $T\ Rr = T\ SMCRr + T\ pcRr$ $T\ lsdfb = \mathrm{MAX}(T\ ctrf,\ T\ ctrr,\ T\ Ft,\ T\ Rr)$ (33)

Thus, the sliding mode control clutch torque computing unit $52g$, the deviation control clutch torque computing unit $52h$, and the feedback control clutch torque computing and outputting unit $52i$ are provided as a clutch torque computing and outputting unit in the feedback control clutch torque computing unit.

On the other hand, in FIG. 2, a throttle opening $\theta$th and an ON-OFF signal are inputted into the feed forward control clutch torque computing unit 53 from the throttle opening sensor 33 and the brake switch 34, respectively.

Then, the feed forward control clutch torque computing unit 53 computes and sets a clutch torque according to the throttle opening $\theta$th while referring to the map (for example, FIG. 6Z) which is set in advance through experiments as the clutch torque T lsdff that is to be provided to the transfer clutch 21 through the feed forward control and then outputs the clutch torque T lsdff to the clutch torque computing unit 55.

Accordingly, when the brakes are being applied by the ON signal inputted from the brake switch 34, in order to avoid the interference with the brake condition, the clutch torque T lsdff provided through the feed forward control is made to be 0.

In addition, in computing the clutch torque according to the throttle opening $\theta$th, corrections may be implemented by the lateral acceleration Gy, the vehicle speed V, and the actual front and rear axle differential speeds $\Delta\omega trf$, $\Delta\omega ctrr$ so that the clutch torque T lsdff can be obtained through a more accurate feed forward control.

The clutch torque T lsdff which is computed through the feed forward control as described above is then outputted to the clutch torque computing unit 55. Namely, the feed forward clutch torque computing unit 53 is provided as a feed forward control clutch torque computing unit.

Inputted into the tire diameter difference computing unit 54 are the lateral acceleration Gy from the lateral acceleration sensor 32, the vehicle speed V from the vehicle speed computing unit 51, the actual front and rear axle differential speeds $\Delta\omega ctrf$, $\Delta\omega ctrr$ from the actual front and rear axle differential speed computing unit $52b$ of the feedback control clutch torque computing unit 52, the front actual left and right wheel differential speed ΔωFt from the actual front left and right wheel differential speed computing unit 52c, and the rear actual left and right wheel differential speed ΔωRr from the rear actual left and right wheel differential speed computing unit 52d. Then, the tire diameter difference computing unit 54 sets, while referring to the map set in advance, a tire diameter difference constant Rtr from a largest one (Δω) of the actual front and rear axle differential speeds Δωctrf, Δωctrr, a front actual left and right wheel differential speed ΔωFt and a rear actual left and right wheel differential speed ΔωRf which result when a pre set condition is established when the vehicle runs substantially straight and that the slippage is unlikely to occur on the four wheel.

To be specific, the above determinated condition is such that the absolute value of the lateral acceleration Gy is 0.1 g or smaller and the vehicle speed is 20 km/h or slower. Then, where this determinated condition is established, a tire diameter difference constant Rtr is set by referring to the map shown in FIG. 7 which shows a relationship between the actual differential speed Δω and the tire diameter difference constant Rtr. The tire diameter difference constant Rtr is set to be in the vicinity of 0.5 in the event that the actual differential speed Δω is extremely small, and is set so as to decrease gradually as the tire diameter difference constant Rtr increases. Namely, as the tire diameter difference constant Rtr increases to be in the vicinity of 0.5, the diameter difference of the tire is determined to be small, whereas as the tire diameter difference constant Rtr decreases from 0.5, the diameter difference of the tire is determined to be large. Note that when used in this embodiment, the diameter difference of the tire is evaluated collectively from the four wheel.

Then, in any other conditions than the condition, since it is not determined whether or not a rotational difference is taking place due to the fitment of the tire which causes from a diameter difference, the tire diameter difference constant Rtr is set to a value that was set previously without computing the tire diameter difference constant Rtr or without updating the value that was set previously.

The reason for this setting is that where the absolute value of the lateral acceleration Gy is larger than 0.1 g, whether or not the rotational difference is taking place due to the tire diameter difference when, for example, the vehicle is cornering, and where the vehicle speed V is faster than 20 km/h, the slippage of the tire is easily permitted, and therefore whether or not the rotational difference is taking place due to the tire diameter difference.

The tire diameter difference constant Rtr which is set as described above is then outputted to the clutch torque computing unit 55. Thus, the tire diameter difference computing unit 54 is provided as the tire diameter difference computing unit.

Inputted into this clutch torque computing unit 55 are respectively the ON-OFF signal from the brake switch 34, an ON-OFF signal from the ABS control unit 35, the clutch torque T lsdfb from the feedback control clutch torque computing unit 52 which results from the feedback control, the clutch torque T lsdff from the feed forward control clutch torque computing unit 53 which results from the feed forward control and the tire diameter difference constant Rtr from the tire diameter difference computing unit 54.

Then, the clutch torque computing unit 55 computes a final clutch torque T lsd that is to be outputted to the transfer clutch 21 from the following equation (34) and outputs the torque so computed to the center differential clutch driving unit 60.

$$T\ lsd = Rtr \cdot T\ lsdff + (1-Rtr) \cdot T\ lsdfb \qquad (34)$$

As is clear from the equation (34), in the event that the diameter difference of tire is small, the tire diameter difference constant Rtr=0.5, and T lsd=0.5·T lsdff+0.5·T lsdfb, whereby the clutch torque T lsdfb provided through the feedback control and the torque clutch T lsdff provided through the feed forward control come to have the same ratios. In contrast, in the event that the diameter difference of the tire becomes larger, the value of the tire diameter difference constant Rtr becomes smaller, and the ratio of the clutch torque T lsdff provided through the feed forward control becomes smaller, whereas the ratio of the clutch torque T lsdfb provided through the feedback control becomes larger. Namely, in the event that the diameter difference is determined to be large, since the ratio of the clutch torque T lsdff resulting through the feed forward control is reduced, whereas the ratio of the clutch torque T lsdfb resulting from the feedback control is increased according to the tire diameter difference resulting then, the slippage can also be suppressed effectively while avoiding the generation of the internal circulating torque.

Here, in the event that there is sent from the ABS control unit 35 the ON signal or a signal indicating that ABS is in operation, the clutch torque T lsd is made to be a constant value CABS that has been set in advance in order to prevent the interference with the ABS control. In addition, also in the event that there is sent from the brake switch 34 the ON signal indicating that the brake switch is switched on, the clutch torque T lsd is made to be a constant value Cbrk set in advance in order to prevent the interference with a brake-applied condition so produced.

As described heretofore, in the present invention, the ratio of the clutch torque obtained through the feedback control and the clutch torque obtained through the feed forward control is changed according to the diameter difference of tire so as to compute the final clutch torque.

In the event that the clutch torque is increased with the tire which differs in the diameter mounted, the tire is driven from the road surface, and the internal circulating torque is generated in the drive line, whereby the engine performance is deteriorated and the durability of the clutch is deteriorated. In addition, there may be caused a risk that a tight corner braking phenomenon is generated. Consequently, while the clutch torque has to be set at the smaller value than a normal one, as with the conventional case, in the event that the clutch torque obtained through the feed forward control and the clutch torque obtained through the feedback control are made to be constant irrespective of the diameter difference, since the rotational difference caused by the diameter difference is not taken into consideration in the feed forward control, the clutch torque cannot be reduced, and therefore, there may be caused a risk that the aforementioned problem takes place.

According to the present invention, however, since the clutch torque can be set appropriately by reflecting the diameter difference of the tire to the clutch torque obtained through the feed forward control, the slippage can also be avoided while suppressing the occurrence of the internal circulating torque, as well as the tight corner braking phenomenon.

According to the embodiment of the present invention, while the feedback control clutch torque computing unit 52 computes the four clutch torques T ctrf, T ctrr, T Ft and T Rr such that the maximum value of the clutch torques so computed becomes the clutch torque T lsdfb provided through the feedback control, depending on the specifications of the vehicle, all of the four clutch torques do not have to be obtained but any one or some of the four clutch torques may be obtained so that the clutch torque that would be provided through the feedback control can be obtained from them.

In addition, according to the embodiment of the present invention, while in the feedback control clutch torque computing unit 52, the respective clutch torques T pcctrf, T pcctrr, T pcFt and T pcRr from the deviation computing unit 52h are added to the respective clutch torques T SMCctrf, T SMCctrr, T SMCFt and T SMCRt from the sliding mode control clutch torque computing unit 52g so as to obtain the final four clutch torques T ctrf, T ctrr, T Ft and T Rr, for the vehicle that is not largely affected by the respective clutch torques T pcctrf, T pcctrr, T pcFt and T pcRr from the deviation computing unit 52h, the clutch torque T lsdfb that would be provided through the feedback control may be obtained only by using the respective clutch torques T SMCctrf, T SMCctrr, T SMCFt and T SMCRt from the sliding mode control clutch torque computing unit 52g.

Furthermore, according to the embodiment of the present invention, while the tire diameter difference constant Rtr is illustrated as being set in the range from the vicinity of 0.5 to a smaller value, depending on the specifications of the vehicle, the tire diameter difference constant Rtr may be set in ranges other than the one described above.

In addition, while the embodiments of the present invention have been described by referring to the control of the transfer clutch 21 for controlling the differential limiting of the center differential 3, the present invention can be similarly applied to the clutch for controlling the differential limiting between the front and rear axles of a four wheel drive vehicle which is not provided with the center differential 3. Furthermore, in the event that the front differential clutch 27 and the rear differential clutch 23 have the device for controlling the clutch torque thereof, it goes without saying that the setting of the clutch torques described in the embodiment can be applied to setting of such clutch torques. However, in the event that setting the clutch torques described in the embodiment of the present invention is applied to the front differential clutch 27, the tire diameter difference constant Rtr is computed on the basis of the front actual left and right wheel differential speed ΔωFt, and in the event that the same is applied to the rear differential clutch 23, the tire diameter difference constant Rtr is computed on the basis of the rear actual left and right wheel differential speed ΔωRr.

Thus, as described heretofore, according to the present invention, since the ratio of the values of the clutch torques provided through the feed forward control and the feedback control is appropriately set while taking into consideration of the diameter difference of the tire mounted, the slippage can also be suppressed effectively while avoiding the occurrence of the internal circulating torque.

The disclosure of Japanese Patent Application No. 2002-278131 filed on Sep. 24, 2002 including the specification, the drawings and the abstract is incorporated herein by reference in its entirety.

While the presently preferred embodiments of the present invention have been shown and described, it is to be understood that these disclosures are for the purpose of illustration and that various changes and modifications maybe made without departing from the scope of the present invention as set forth in the appended claims.

What is claimed is:

1. A differential limiting control apparatus for a vehicle having a clutch unit interposed between one rotational shaft and another rotational shaft for variably changing a driving force transmission between the one rotational shaft and the other rotational shaft, comprising:

a target differential speed setting unit for setting a target differential speed between the one rotational shaft and the other rotational shaft, an actual differential speed detecting unit for detecting an actual differential speed between the one rotational shaft and the other rotational shaft, a first control unit for computing a first clutch torque of the clutch unit based on a deviation between the target differential speed and the actual differential speed, a throttle opening amount detecting unit for detecting a throttle opening amount, a second control unit for computing a second clutch torque of the clutch unit based on the throttle opening amount, a tire diameter difference computing unit for computing a diameter difference of a tire, and a final clutch torque computing unit for computing a final clutch torque wherein the final clutch torque computing unit computes the final clutch torque by a computation involving the first clutch torque, the second clutch torque, and at least one tire diameter difference ratio coefficient value which tire diameter difference ratio coefficient value changes according to the diameter difference of the tire so as to suppress a wheel slippage.

2. The differential limiting control apparatus as set forth in claim 1, wherein the first control unit comprises:

a first clutch torque computing unit for computing the deviation between the target differential speed and the actual differential speed, and computing the first clutch torque by applying a sliding mode control with a switching function using at least a polarity related to an integral term of the deviation.

3. The differential limiting control apparatus as set forth in claim 2, wherein:

the clutch unit is interposed between a front axle and a rear axle.

4. The differential limiting control apparatus as set forth in claim 2, wherein:

the clutch unit limits a differential action of a differential interposed between a left wheel and a right wheel.

5. The differential limiting control apparatus as set forth in claim 1, wherein:

the clutch unit is interposed between a front axle and a rear axle.

6. The differential limiting control apparatus as set forth in claim 1, wherein:

the clutch unit limits a differential action of a differential interposed between a left wheel and a right wheel.

7. The differential limiting control apparatus as set forth in claim 1, further comprising a brake switch, and when an ON signal is inputted from the brake switch, the second clutch torque is made to be zero.

8. The differential limiting control apparatus as set forth in claim 1, wherein the final clutch torque (T lsd) involves the following equation:

$$Tlsd = Rtr\ Tlsdff + (1-Rtr)\ Tlsdfb$$

with Rtr representing the tire diameter difference ratio coefficient value based on the tire diameter difference;

Tlsdff representing the second clutch torque; and

Tlsdfb representing the first clutch torque.

9. The differential limiting control apparatus as set forth in claim 8, wherein the Rtr decreases as the diameter difference of the tire increases.

10. The differential limiting control apparatus as set forth in claim 8, wherein the Rtr is 0.5 in the case where the diameter difference of the tire is substantially zero.

11. The differential limiting control apparatus as set forth in claim 1, wherein said computing unit utilizes a first contribution value and a second contributing value and wherein each of said first and second contributing values involves said at least one tire diameter difference ratio coefficient value, and wherein said first contributing value associated with the first clutch torque in the computation of the final clutch torque increases as the diameter difference of the tire increases and said second contributing value associated with the second clutch toque in the computation of the final clutch torque decreases as the diameter difference of the tire increases, and the first contributing value associated with the first clutch torque decreases and the second contributing value associated with the second clutch torque increases as the diameter difference of the tire decreases.

12. The differential limiting control apparatus as set forth in claim 1, wherein said at least one tire diameter difference ratio coefficient value comprises a first tire diameter difference ratio coefficient value and a second tire diameter difference ratio coefficient value, and wherein said final clutch torque computing unit computes the final clutch torque by a computation comprising said first tire diameter difference ratio coefficient value and said second tire diameter difference ratio coefficient value, wherein said first tire diameter difference ratio coefficient value is in association with one of said first and second clutch torques, and wherein said second tire diameter difference ratio coefficient value is in association with an opposite one of said first and second clutch torques, and wherein the final clutch torque computing unit reduces the one of said first and second tire diameter difference ratio coefficient values that is associated with said second clutch torque and increases the opposite one of said first and second ratio coefficient values that is associated with said first clutch torque as the diameter difference of the tire increases.

13. The differential limiting control apparatus as set forth in claim 12, wherein:
the clutch unit is interposed between a front axle and a rear axle.

14. The differential limiting control apparatus as set forth in claim 12, wherein:
the clutch unit limits a differential action of a differential interposed between a left wheel and a right wheel.

15. The differential limiting control apparatus as set forth in claim 12, wherein said final clutch torque computing unit computes the final clutch torque with a summation involving a first multiplication comprising said first clutch torque and said second tire diameter difference ratio coefficient value and a second multiplication comprising said second clutch torque and said first tire diameter difference ratio coefficient value.

16. A differential limiting control apparatus for a vehicle having a clutch unit interposed between one rotational shaft and another rotational shaft for variably changing a driving force transmission between the one rotational shaft and the other rotational shaft, comprising:
a target differential speed setting unit for setting a target differential speed between the one rotational shaft and the other rotational shaft,
an actual differential speed detecting unit for detecting an actual differential speed between the one rotational shaft and the other rotational shaft,
a first control unit for computing a first clutch torque of the clutch unit based on a deviation between the target differential speed and the actual differential speed,
a throttle opening amount detecting unit for detecting a throttle opening amount,
a second control unit for computing a second clutch torque of the clutch unit based on the throttle opening amount,
a tire diameter difference computing unit for computing a diameter difference of a tire and outputting a tire diameter difference value, and
a final clutch torque computing unit for computing a final clutch torque wherein the final clutch torque computing unit receives, as an input, said tire diameter difference value and computes the final clutch torque by a computation involving the first clutch torque and the second clutch torque, and which computation includes a ratio coefficient value which ratio coefficient value changes according to the diameter difference of the tire so as to vary the final clutch torque to promote wheel slippage suppression.

17. A differential limiting control apparatus for a vehicle having a clutch unit interposed between one rotational shaft and another rotational shaft for variably changing a driving force transmission between the one rotational shaft and the other rotational shaft, comprising:
a target differential speed setting unit for setting a target differential speed between the one rotational shaft and the other rotational shaft,
an actual differential speed detecting unit for detecting an actual differential speed between the one rotational shaft and the other rotational shaft,
a first control unit for computing a first clutch torque of the clutch unit based on vehicle behavior through a feedback control,
a second control unit for computing a second clutch torque of the clutch unit based on behavior of the vehicle through a feed forward control,
a tire diameter difference computing unit for computing a diameter difference of a tire and outputting a tire diameter difference value, and
a final clutch torque computing unit for computing a final clutch torque wherein the final clutch torque computing unit receives, as an input, said tire diameter difference value and computes the final clutch torque by a computation involving (i) the first clutch torque and a first weighting value associated with said tire diameter difference value and (ii) and the second clutch torque and a second weighting value associated with said tire diameter difference value, and wherein said first and second weighting values vary in opposite fashion upon a change in the tire diameter value.

* * * * *